Patented Aug. 29, 1933

1,924,719

UNITED STATES PATENT OFFICE 1,924,719

ARRANGEMENT OF NOZZLE VALVE FOR EXPLOSION TURBINES

Hans Holzwarth, Dusseldorf, Germany, assignor to Holzwarth Gas Turbine Co., San Francisco, Calif., a corporation of Delaware Application June 27, 1928, Serial No. 288,591, and in Germany July 12, 1927

1 Claim. (Cl. 60—41)

The nozzle valves of explosion turbines have up to the present time been arranged in such a way, that the valve stem is guided in a proper nozzle chamber outside the explosion chamber, the combustion gases being forced to flow radially with respect to the turbine shaft from the valve seat to the outside, whereby the greatest part of the gas current had to undergo a reversal of direction after striking the walls of the nozzle chamber. It was necessary therefore to make the dimensions of the nozzle chamber large enough to allow the gases to undergo such reversal of direction without simultaneous throttling. I have found, that the heat losses in the nozzle chamber between the valve and the minimum cross section of the nozzle in prior constructions were extraordinarily great in comparison with the entire heat transmission to the walls contacted by the gases, so that a decidedly unfavorable influence on the total efficiency of the turbine resulted.

The present invention provides a novel arrangement of nozzle valve whereby the heat losses are reduced to a minimum or at least greatly diminished. This is attained by a novel mounting of the nozzle valve as a piston valve in the explosion chamber in such a way that the gases at the opening of the nozzle valve will flow in a central radial direction to the interior of the nozzle chamber, the gases suffering a minimum deflection by the wall of the nozzle chamber until they reach the minimum cross section of the nozzle. The volume of the space between the valve seat and the minimum cross section of the nozzle is in this manner brought down to a minimum, thereby reducing as far as possible the friction of the gases on the wall, which increases the radiation of heat.

Figure 1:
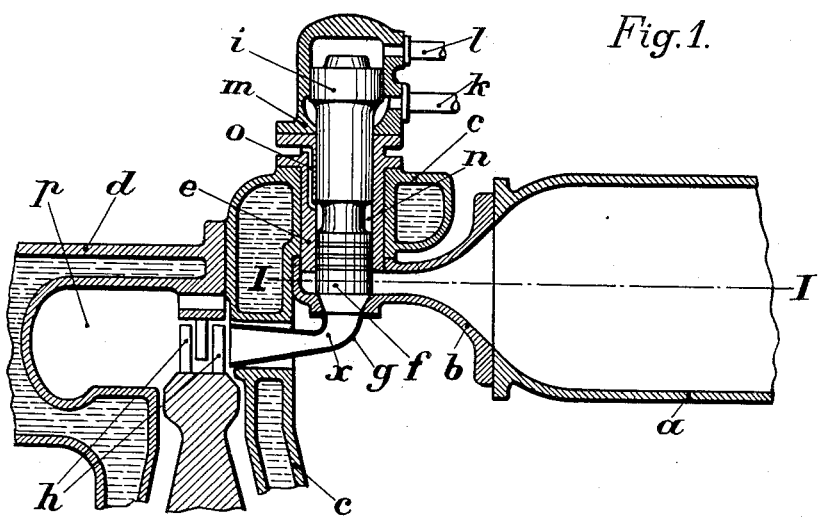
Figure 2:
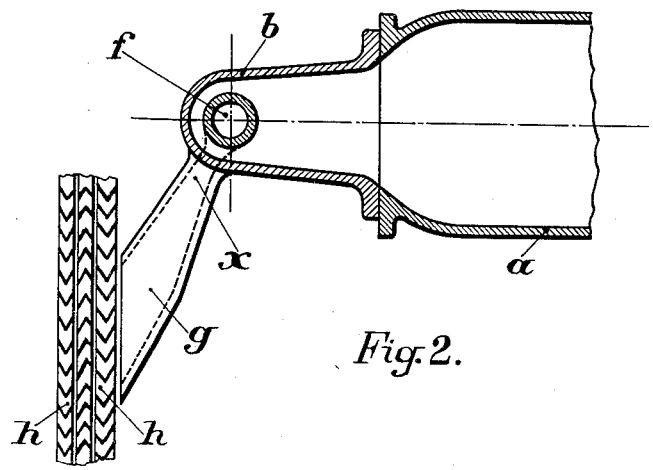

In order to explain my invention more fully, reference is had to the accompanying drawing which shows by way of example a preferred embodiment of the invention; in said drawing, Fig. 1 shows a longitudinal section through the explosion chamber, valve chamber, and nozzle and exhaust chamber, and Fig. 2 a section through line I—I of Fig. 1.

(a) is the explosion chamber, (b) the endpiece or outer portion of the latter, which receives the valve seat, (c) the water cooled valve chamber, and next to it the exhaust chamber (d). (f) is the nozzle valve constructed as a piston valve traversing the end piece of the explosion chamber. As will be seen from Fig. 1, the outlet portion (b) of the explosion chamber tapers toward the nozzle valve and terminates in a flattened portion defined in part by two closely spaced parallel walls shown in section in such figure. The sleeve (e) in which the piston valve (f) is guided, is mounted in the water-cooled valve chamber (c). Mounted on this sleeve is the hood (m) in which slides the enlarged upper part (i) of the cylindrical valve body. Below the valve seat and adjoining the same is the nozzle (g), which ends at the blade rim h, h; the exhaust chamber (p) extending behind the blade rim is mounted in the water cooled exhaust casing (d). The governing or control of the valve is suitably effected by pressure-oil which is admitted by pipes (l) and (k). The pipe (l) is connected to an oil accumulator which receives oil under a uniform pressure, (for instance of 2 atm.). The pipe (k) is connected to an oil governing device, which is exposed alternately to a higher oil pressure (for instance 8 atm.) and to an oil discharge which releases the oil pressure. Upon admitting the oil under pressure to the pipe (k) the valve is lifted for a distance at least equal to the distance between the parallel walls at the flattened end of the explosion chamber, against the pressure of the oil of pipe (l), that is the pressure acting on the top side of the valve. When the oil fed by pipe (k) is connected to the oil discharge the oil pressure of pipe (l) preponderates and closes the valve. The oil may be intermittently fed to the valve by means of distributors of the type disclosed in my Patent No. 877,194.

In order to prevent the gases from entering the oil and the oil from entering the explosion chamber, I have found it advantageous to provide a groove (n) above the piston rings of the valve body (f), the groove being connected to an outlet (o) opening into the atmosphere.

It will be seen from the description given above that contrary to the previous arrangements the space between the valve seat and the minimum cross section (x) of the nozzle is very small, in consequence of which the heat transmission through the wall on the inside of nozzle chamber is as small as possible. This reduction of heat radiation is also favored by the fact, that the gases on the average undergo smaller deviations of direction by the wall of the nozzle chamber than in previous arrangements, the wall friction being in this way greatly reduced.

The valve guide, in the form of the invention shown in the drawing, has the same diameter as the valve head. Moreover by making that portion of the valve which is positioned within the casing when the valve is closed of equal diameter with the portion extending into the explosion chamber, I enable the valve to be more efficiently cooled, while at the same time the valve is relieved of the pressure of the explosion gases when it is in its closed position, whereby the power required to open the valve is reduced.

I claim therefore:—

In an explosion turbine, the combination of an explosion chamber adapted to be provided with inlet mechanism at one end thereof, and having a reduced discharge end opposite the inlet end, defined in part by substantially parallel opposite walls, the distance between such walls being considerably less than the minimum diameter of the body of the chamber, a valve seat in one of said walls, a nozzle communicating with the discharge end of the explosion chamber through said valve seat and adapted to receive the explosion gases generated in said chamber, a nozzle valve extending into and through said reduced end perpendicularly to said parallel walls and having a bottom face cooperating with said valve seat to close the communication between the nozzle and explosion chamber, the valve being so formed that in the closed position no pressure sufficient to open the same can be exerted thereon by the exploded gases, the distance between said parallel walls being no greater than the lift of the valve, so that when the valve is in retracted position it is completely withdrawn from such discharge end and affords unobstructed passage for the gases from the main body of the explosion chamber into the nozzle.

HANS HOLZWARTH.